March 3, 1970  A. R. DASTUR  3,498,879

NUCLEAR REACTOR CONTROL USING NEUTRON ABSORPTION FLUID

Filed May 5, 1967

ARDESHIR RUSTOM DASTUR
INVENTOR.

BY R. C. Eckersley

PATENT AGENT

United States Patent Office 3,498,879
Patented Mar. 3, 1970

3,498,879
NUCLEAR REACTOR CONTROL USING NEUTRON ABSORPTION FLUID
Ardeshir Rustom Dastur, Peterborough, Ontario, Canada, assignor to Canadian General Electric Company Limited, Toronto, Ontario, Canada, a corporation of Canada
Filed May 5, 1967, Ser. No. 636,472
Claims priority, application Canada, May 6, 1966, 959,698
Int. Cl. G21c 5/02; G22c 7/00
U.S. Cl. 176—52                       5 Claims

ABSTRACT OF THE DISCLOSURE

A nuclear reactor having a plurality of separate fuel channels, each having coolant conduits connected thereto for the passage of coolant through the channels, and a tube surrounding each individual channel for the admission of insulant gas as a thermal isolating annulus to minimize the passage of heat from the channels to the liquid moderator surrounding them, is provided with a second gas supply connected with a plurality of the insulant annuli to provide neutron absorption gas consisting of boron hydride, helium 3, xenon 135 or krypton, to control the rate of power generation of the reactor, and purge control means connected with the insulant gas system for the ready purging of neutron absorption gas from the system.

---

Figure 1:
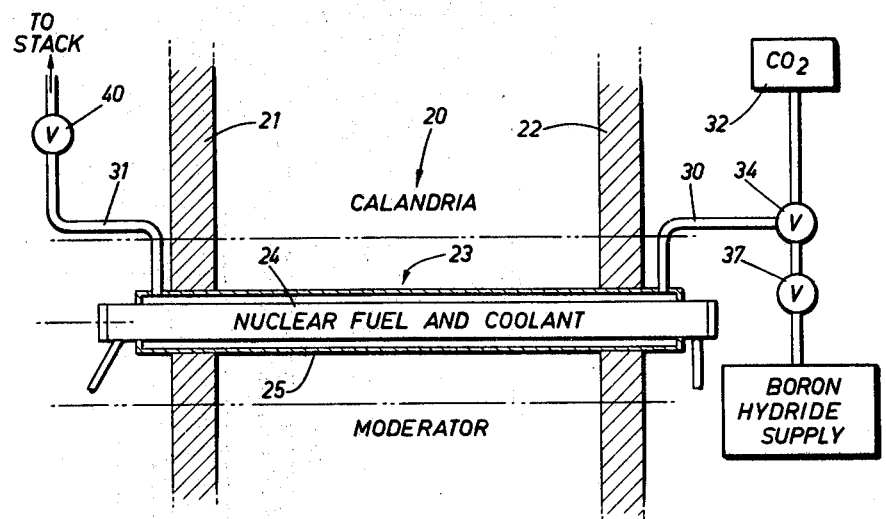

To provide reactivity control a nuclear reactor having a plurality of fuel channels containing fuel material is provided with gas annuli about the individual channels, into which a neutron absorbing gas such as a boron hydride or krypton is introduced to control the operation of the reactor.

This invention is directed to a method for controlling the rate of reaction of a nuclear reactor and in particular to a method of providing rapid changes in the rate of the fission process of a reactor, and to apparatus for carrying out the method.

Operation of a nuclear reactor in a satisfactory and safe manner is dependent upon accurate control of the neutron multiplication factor, and many complex and expensive means have been provided in previous reactors to effect such control.

In order to effect fine control of a reactor when it is on power in order to control the rate of power generation, it is necessary to be able to vary the level of neutron flux of moderated or slow neutrons within the reactor, in order to maintain the rate of the fission process at the desired level. In the extreme, when it is necessary to shut the reactor down, or in emergency to scram the reactor, the same control of fission process is exercised in order to control the neutron multiplication factor, only to a much greater extent and with more rapidly actuated means.

It will be appreciated that owing to the rate at which nuclear reaction proceeds the control system must necessarily be fast acting and reliable in the extreme. Owing to the inertia of the mechanical parts involved, or the rates at which heavy water moderator can be added to or removed from the core region, in the case of heavy water moderated reactors, the times required to effect adjustment of the overall reactivity level of a reactor are quite significant. Perhaps what is equally important is that the time to restart a reactor, when the reason for shut-down is merely transient is dependent upon restoring the reactor to operative condition before poisoning of the reactor occurs due to the formation of xenon past the start-up point. In the heavy water moderated type reactor, after the moderator has been dumped to scram the reactor it is then necessary to pump back a considerable quantity of moderator liquid, which occupies a considerable time, during which the reactor is off the line and steadily accumulating poison.

Also, in reactors employing mechanically driven safety rods to shut down the reactor, the need for fast insertion of the boron and steel safety rods generally necessitates a high speed drive mechanism which is not readily adapted to provide the other type of reactor control also required, generally referred to as shim control by means of which the level of reaction is maintained at a desired predetermined value.

The present invention overcomes the foregoing disadvantages by providing a gaseous neutron absorber having suitable physical and chemical characteristics to make it compatible with reactor operation and materials used, and having a neutron capture cross-section significantly higher than that of the solid materials presently in use.

The characteristics of a neutron absorbing fluid for use within a reactor which determine the choice of fluid, is determined by:

(1) A sufficiently high neutron absorption cross-section to provide reaction control to effect shut-down and start-up, overall power generation rate shim control, or zonal shim control of various segments of the reactor core.

(2) Physical property characteristics to permit rapid movement into and removal from the core of a reactor for shut-down and start-up purposes.

(3) Relatively good chemical stability in reactor environment and chemical compatibility with reactor components.

(4) The absence of significant quantities of deleterious by-products after use of the absorber fluid within a reactor.

Suitable fluids for carrying out the present invention are the gaseous boron hydrides, including diborane ($B_2H_6$). This material is a colorless gas with a melting point of $-165.5°$ C. and a boiling point of $-92.5°$ C. It is slightly soluble in water and has substantially no corrosive action on zirconium or aluminum alloys.

The desired characteristics for a suitable fluid include: physical characteristics which facilitate rapid addition to and removal from the annulus between the pressure and calandria tubes; neutron absorption characteristics favorable in magnitude for site shut-down and starting, overall reactor power generation rate shim control, or zonal shim control; and having physical properties such that the heat flow through the substance would not be such as to comprise or imperil the safety of the calandria tube structures.

Alternative gases which may be considered are helium 3, an isotope which may be separated from the more common helium, and xenon 135, which is the highest known neutron absorbing material but does not occur naturally, being a by-product of radioactive processes, and being itself radioactive is expensive to obtain and handle and requires replacement owing to its own radioactive decay.

Considering the safety aspects of using boron hydride, in a reactor after exposure to radiation the boron breaks down into lithium and helium with hydrogen being freed. However, the quantities of free gas thus evolved are in the order of milligrams for the shut-down of a major plant. Deuterium and tritium (which is poisonous) are also formed but in negligible quantities, and would not significantly compromise the application of the gaseous substance.

In comparing the effectiveness of boron hydride with control rods of the type presently used, where $k$, the multiplication factor is initially unity during stable operation of a reactor, calculations show that a "load" of 79 mk. (milli $k$.) is effected in a nuclear reactor if one atmosphere of boron hydride is introduced within the core of the reactor to isolate the individual reactive sites. That is to say $k$—the multiplication factor—is reduced from unity to 0.921 by boron hydride at one atmosphere pressure. Thus for a 300 megawatt reactor having in the order of 300 sites, a "load" (which is a reduction in the $k$ factor) equal approximately to 79 divided by the number of sites, or approximately 0.267 mk. per site per atmosphere of boron hydride, is provided as compared with a "load" of approximately 0.075 mk. per site presently provided by a control rod.

It will be appreciated that the introduction and removal of the gas compares favourably with existant methods of reactivity control. The boron hydride neutron absorbed can be readily flushed from a reactor in a short period of time by use of a suitable flushing agent such as carbon dioxide.

Many reactors of the type having a plurality of individual sites of fissionable material may be readily adapted for the introduction of boron hydride to some of the reactive sites, thus making possible the control of power oscillation due to xenon concentration redistribution across the reactor, and also permitting reactivity shim control. It will be appreciated that the effectiveness of the boron hydride gas is substantially directly proportional to the density thereof, being a direct function of pressure, at constant temperature, so that it will be seen that the fineness with which reactivity can be controlled using boron hydride is determined predominantly by the accuracy of control of pressure of the gas.

It is contemplated that in place of natural boron hydride the boron 10 isotope may be substituted in the $B_2H_6$ molecules thus increasing the "load" of the gas by a factor of 5 over naturally occurring boron, for given temperature and pressure conditions.

What has been provided is a method of controlling the reactivity of a nuclear reactor having a plurality of sites of fissionable material in mutual reactive relation, comprising the step of introducing a substantially chemically inert gaseous material of relatively high neutron absorption into neutron absorbing relation with at least one of the sites of the reactor, whereby the rate of power generation of the reactor may be controlled.

Apparatus for carrying out the present invention in a nuclear reactor having a plurality of discrete sites of fissionable material in mutual neutron exchange comprises neutron permeable conduit means extending within the reactor in close proximity to a portion of the sites of the reactor and connected with means to supply a gaseous material of high neutron absorption cross-section thereto, whereby on supply of the gaseous material to the reactor, the neutron multiplication factor is effectively reduced and the generation of power is effectively controlled.

It is further contemplated that in a pressure tube reactor employing an insulating annulus filled with an insulant gas such as carbon dioxide, that the addition of the neutron absorption gas with the insulant gas may be carried out to provide modified control of the reactor sites.

Figure 2:
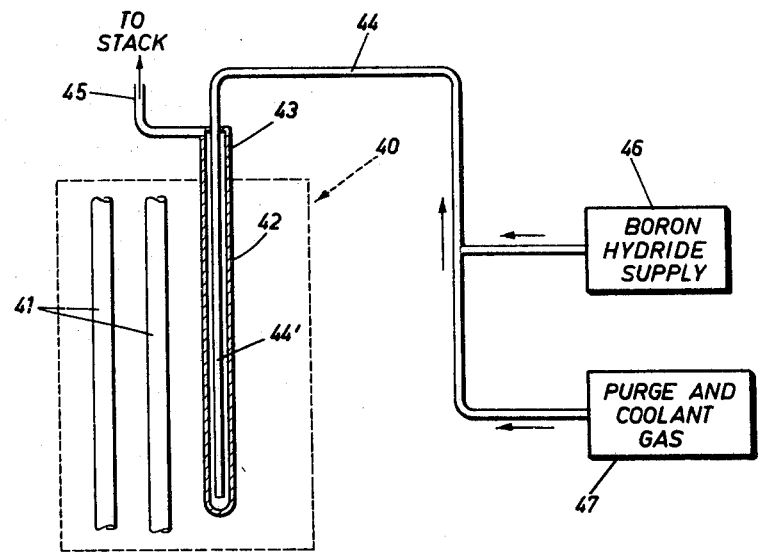

Examples of nuclear reactors capable of embodying the present invention are described, reference being had to the accompanying drawings wherein:

FIGURE 1 is a partial cross-section of a typical nuclear site in a heavy water moderated reactor; and FIGURE 2 shows diagrammatically an adaption of a control rod installation in a vertical reactor to the present invention.

Referring to the FIGURE 1, this shows a portion of the calandria of a heavy water moderated liquid cooled nuclear reactor having horizontal pressure tubes suitable for on-load refuelling. While a horizontal tube arrangement is illustrated by way of example, the orientation could also be vertical. Structures of this type have calandria end walls 21, 22 supporting a plurality of pressure tube assemblies 23, each tube assembly comprising a central pressure tube 24 adapted to contain the nuclear fuel and coolant, and a surrounding annular tube 25, providing an insulating annulus in which carbon dioxide gas is maintained to provide insulation to the surrounding moderator liquid, usually heavy water.

The carbon dioxide, shown supplied from a cylinder 32, passes to the annulus tube 25 by way of a supply pipe 30, small quantities leaving the reactor by pipe 31 and generally passing to the stack for exhaustion to the atmosphere to avoid overheating by conduction. The present invention provides a supply of boron hydride 33 connected by way of a pressure regulator 37 and a 3-way control valve 34 to the carbon dioxide supply pipe 30. In order to provide the necessary control of pressure within the reactor tube 25, the use of a pressure regulating relief valve 40 at the stack outlet is shown.

In operation, it will be seen that the insulant gas ($CO_2$) normally supplied to the insulating annulus of one or more of the reactive sites may be flushed therefrom, by operation of the 3-way valve 34 to admit boron hydride into the tube 25 surrounding the site tube 24.

The use of a proportioning arrangement to selectively mix the two gases to provide fine or shimming control is contemplated.

In FIGURE 2, the vertical reactor 40, which might be, interalia a light boiling water reactor utilizing enriched fuel or a vertical embodiment of FIGURE 1, a control rod tube formerly used to permit the admission of a control rod mechanically driven into place by a high-speed control mechanism is adapted for use with the present invention by the provision of a central tube 44' connected by the supply pipe 44 to a source of boron hydride 46 and to a source 47 of purge and coolant gas such as carbon dioxide. In operation, when it is necessary to provide neutron absorption at the control site 42, boron hydride gas is admitted from the supply 46 at a predetermined pressure, passing from the admission pipe 44' upwardly to the out-pipe 45 and thence to the stack under control conditions similar to those set forth for FIGURE 1. When it is required to reduce or totally remove the neutron absorption function, the admission of purge and coolant gas such as carbon dioxide from the supply 47 purges the boron hydride to the stack, together with the minor quantities of by-products associated therewith as previously defined.

It is contemplated that in view of the minor proportional changes to the boron hydride, a close-circuit supply may be used. However, economics may not generally make this worthwhile in view of the comparative cost of the gas and the relatively insignificant quantities of obnoxious by-products resulting therefrom after irradiation.

It will be appreciated that in the case of a heavy water moderated reactor employing a gas insulant annulus about each of its sites, either in horizontal or vertical or other configuration, the present invention permits the reactor to be scrammed in a matter of a few seconds and to be returned to full power much more rapidly than a reactor employing moderated dump for shut-down, thus obviating the need to provide moderator dump facilities, which are extremely expensive and add additional complexity to the reactor structure, as well as involving a probable reduction in total reliability and efficiency of the system. Evidently, this advantage applies also to any reactor system depending upon moderator dump for reactor shut-down.

In addition, the method is useful in the majority of reactors in place of control rods and shut-down rods, thereby decreasing the cost of production of the reactor, simplifying the operation thereof, and increasing the reliability of the systems.

In addition to the previously disclosed gaseous substances, it has been found that krpyton is particularly useful and provides certain advantageous operating characteristics compared with the gaseous boron hydrides. Thus krypton, an inert elemental noble gas is quite stable, whereas the boron hydrides are subject to decomposition, as previously disclosed.

Krypton has a neutrol absorption cross section of 24 barns compared with a value of 750 barns for boron hydride, so that a pressure range of 50 to 100 p.s.i. can be utilized with krypton, compared with the lower range of about 1 atmosphere for boron hydride. In addition to providing greater freedom of use, the physical admission of the krpyton, being at a higher pressure, is more readily effected, to provide more uniform reactor response.

The need to provide dilution of the absorption gas with carbon dioxide when being used for shimming control is no longer present in the case of krypton, and the creation of reactor transients is avoided.

Instead of the customary user of depleted or poisoned fuel in the more active zones of the reactor, the improved zonal control permits the use of a complete new fuel charge, which greatly simplifies operation.

What I claim as new and desire to secure by Letters Patent of the United States is:

1. In a nuclear reactor having a plurality of discrete sites of liquid cooled pressure tubes containing fissionable material in mutual neutron exchange, having liquid moderator surrounding said tubes in neutron moderating relation therewith and an individual tube of neutron permeable material surrounding each said pressure tube to form an annulus surrounding the respective tube, and first gas supply means for supplying an insulant gas to the thus formed annuli the improvement comprising second gas supply means to supply gaseous material of high neutron absorption cross section to at least a number of said annuli to reduce the respective neutron multiplication factor, means to control the pressure of said gaseous material within said annuli, and purge control means connected with said first gas supply means whereby the rate of power generation of said reactor may be readily reduced and restored.

2. A nuclear reactor as claimed in claim 1 wherein said second gas supply is boron hydride.

3. A nuclear reactor as claimed in claim 1 wherein said second gas supply is helium 3.

4. A nuclear reactor as claimed in claim 1 wherein said second gas supply is xenon 135.

5. A nuclear reactor as claimed in claim 1 wherein said second gas supply is krypton.

References Cited

UNITED STATES PATENTS

| 2,832,733 | 4/1958 | Szilard | 176—86 |
| 2,979,450 | 4/1961 | Dusbabek | 176—22 |
| 3,025,228 | 3/1962 | Whitelaw | 176—22 |
| 3,227,619 | 1/1966 | Plante | 176—22 |
| 3,251,746 | 5/1966 | Jeffries et al. | 176—86 |
| 3,294,643 | 12/1966 | Guernsey | 176—22 |

FOREIGN PATENTS

| 1,457,499 | 9/1966 | France. |
| 1,316,533 | 12/1962 | France. |
| 866,305 | 4/1961 | Great Britain. |
| 1,146,987 | 4/1963 | Germany. |
| 44,886 | 4/1966 | Germany. |

REUBEN EPSTEIN, Primary Examiner

H. E. BEHREND, Assistant Examiner

U.S. Cl. X.R.

176—22, 86